United States Patent
Keaton et al.

(10) Patent No.: US 9,416,214 B2
(45) Date of Patent: Aug. 16, 2016

(54) POLYURETHANES MADE USING BISMUTH THIOCARBAMATE OR THIOCARBONATE SALTS AS CATALYSTS

(71) Applicants: Richard J. Keaton, Pearland, TX (US); Peter M. Margl, Midland, MI (US); Rajat Duggal, Pearland, TX (US); Scott D. Boelter, Saginaw, MI (US); Duane R. Romer, Midland, MI (US); Nathan Wilmot, Missouri City, TX (US)

(72) Inventors: Richard J. Keaton, Pearland, TX (US); Peter M. Margl, Midland, MI (US); Rajat Duggal, Pearland, TX (US); Scott D. Boelter, Saginaw, MI (US); Duane R. Romer, Midland, MI (US); Nathan Wilmot, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/390,717

(22) PCT Filed: Mar. 26, 2013

(86) PCT No.: PCT/US2013/033832
§ 371 (c)(1),
(2) Date: Oct. 3, 2014

(87) PCT Pub. No.: WO2014/031181
PCT Pub. Date: Feb. 27, 2014

(65) Prior Publication Data
US 2015/0065675 A1    Mar. 5, 2015

Related U.S. Application Data

(60) Provisional application No. 61/638,347, filed on Apr. 25, 2012.

(51) Int. Cl.
| | | |
|---|---|---|
| C08G 18/00 | (2006.01) | |
| C08G 18/22 | (2006.01) | |
| C08G 18/10 | (2006.01) | |
| C08G 18/08 | (2006.01) | |
| C08G 18/65 | (2006.01) | |
| C08G 18/76 | (2006.01) | |
| C08G 18/32 | (2006.01) | |
| C08G 18/48 | (2006.01) | |
| C08G 101/00 | (2006.01) | |

(52) U.S. Cl.
CPC .............. *C08G 18/227* (2013.01); *C08G 18/10* (2013.01); *C08G 18/14* (2013.01); *C08G 18/3206* (2013.01); *C08G 18/4883* (2013.01); *C08G 18/6564* (2013.01); *C08G 18/7664* (2013.01); *C08G 18/7671* (2013.01); *C08G 2101/005* (2013.01); *C08G 2101/0058* (2013.01)

(58) Field of Classification Search
CPC .. C08G 18/10; C08G 18/14; C08G 2101/005; C08G 2101/0058; C08G 18/227
See application file for complete search history.

(56) References Cited

U.S. PATENT DOCUMENTS

| | | | |
|---|---|---|---|
| 3,714,077 A | 1/1973 | Cobbledick | |
| 4,006,124 A * | 2/1977 | Welte | C07F 7/22 521/111 |
| 4,292,411 A | 9/1981 | Jourquin | |
| 4,584,362 A | 4/1986 | Leckart | |
| 4,788,083 A | 11/1988 | Dammann | |
| 5,011,902 A | 4/1991 | Foucht | |
| 5,574,123 A * | 11/1996 | Bock | C08G 18/4018 528/45 |
| 5,902,835 A | 5/1999 | Meier | |
| 5,972,189 A | 10/1999 | McMurdie | |
| 6,348,121 B1 | 2/2002 | Schoener | |
| 6,590,057 B1 | 7/2003 | Brecht | |

FOREIGN PATENT DOCUMENTS

WO    2005/058996 A    6/2005

* cited by examiner

*Primary Examiner* — Michael L Leonard
(74) *Attorney, Agent, or Firm* — Gary C Cohn PLLC

(57) ABSTRACT

Polyisocyanate-based polymers are formed by curing a reaction mixture containing at least one polyisocyanate and at least one isocyanate-reactive compound having at least two isocyanate-reactive groups in the presence of a bismuth mono- or dithiocarbamate or mono- or dithiocarbonate salt.

13 Claims, No Drawings

POLYURETHANES MADE USING BISMUTH THIOCARBAMATE OR THIOCARBONATE SALTS AS CATALYSTS

This invention relates to processes for making polymers from polyisocyanates and isocyanate-reactive materials. The invention is particularly applicable to making cast polyurethane elastomers.

Many solid or microcellular polyurethane elastomers are manufactured using cast elastomer methods. These elastomers are made by reacting a high equivalent weight polyol and a chain extender material with a polyisocyanate compound. Because it is usually intended to form a highly flexible, rubbery product, the amount of chain extender in the formulation is usually somewhat small. The elastomer is produced by mixing the starting materials and transferring the mixture into a mold where it is cured, usually with application of heat. Some or all of the high equivalent weight polyol may be pre-reacted with the polyisocyanate in a preliminary step to form an isocyanate-terminated prepolymer or quasi-prepolymer. Such a prepolymer is then caused to react with the chain extender and optionally a remaining portion of the high equivalent weight polyol during the molding step.

Open time is very important in cast elastomer processes. Once the starting materials are mixed, they must remain in an uncured, flowable state for several minutes to allow the mixture to be degassed (in most cases) and transferred into the mold. If the reaction proceeds too quickly, the mold may not fill completely and/or flow lines or other defects can appear in the parts, which can lead to high reject rates.

Once the mold is filled, however, a rapid cure is wanted, to reduce cycle times and maximize mold usage.

Organomercury compounds are often the catalysts of choice for cast elastomer processes. Organomercury catalysts offer an important combination of attributes that have proven to be extremely difficult to duplicate with other catalyst systems. These organomercury catalysts provide a very desirable curing profile in which a long open time is followed by a rapid cure. A second attribute of organomercury catalysts is that they produce polyurethane elastomers that have very desirable physical and mechanical properties.

Mercury catalysts are undesirable from an environmental and worker exposure standpoint, and in many jurisdictions these are being phased out. Therefore, a replacement catalyst system is needed. Such a replacement catalyst system ideally would provide the attributes of organomercury catalysts, including a desirable cure profile, good property development in the product, and good surface appearance.

Various bismuth compounds have been described as polyurethane catalysts. Bismuth carboxylates, for example, are described in U.S. Pat. No. 3,714,077 (polyurethane foam systems), U.S. Pat. No. 4,584,362 (as sole catalysts in polyurethane elastomer systems) and U.S. Pat. No. 5,011,902 (in admixture with other metallic catalysts in plywood patch systems). As mentioned in WO 2005/058996, those bismuth catalysts by themselves are too reactive and lead to short pot life when used in polyurethane elastomer systems. In addition, WO 2005/058996 reports that these catalysts tend to lose activity when stored in a polyol. WO 2005/058996 purports to address these problems by using a bismuth catalyst together with certain titanium, zirconium, hafnium, iron, cobalt or aluminum catalysts.

Other bismuth catalysts that have been described include bismuth mercaptides (e.g., U.S. Pat. No. 4,788,083 and U.S. Pat. No. 6,348,121) and bismuth alkoxides (e.g., U.S. Pat. No. 3,714,077).

This invention is in one aspect a process for preparing a polyisocyanate-based polymer, comprising forming a reaction mixture containing at least one polyisocyanate, at least one isocyanate-reactive compound having at least two isocyanate-reactive groups and at least one catalyst, and then curing the reaction mixture to form a polymer, wherein the catalyst includes a bismuth salt of a mono- or dithiocarbamate compound, a bismuth salt of a mono- or dithiocarbonate compound, or a mixture of two or more such bismuth salts.

These bismuth salts have been found to provide long open times in many polyurethane systems, followed by a very rapid cure. Unlike other bismuth compounds, these bismuth salts are very useful catalysts for cast polyurethane elastomer systems and other polyurethane systems requiring a long open time, even when used by themselves as the sole catalyst in such systems.

In addition, polymer properties are obtained that are very similar to those provided by the mercury catalysts.

A polymer is prepared in accordance with the invention by forming a mixture of at least one organic polyisocyanate compound, at least one isocyanate-reactive material that reacts at least difunctionally with isocyanate groups and the bismuth salt, and curing the mixture to form the polymer. Curing is achieved by subjecting the mixture to conditions sufficient for the organic polyisocyanate compound and the isocyanate reactive material to react to form the polymer. The polymer will in most cases contain one or more of urethane linkages, urea linkages, allophanate linkages, biuret linkages, isocyanurate linkages, amide linkages, oxazolidone linkages, or some of two or more of these types of linkages.

The catalyst is a bismuth salt of a mono- or dithiocarbamate compound or mono- or dithiocarbonate compound (or a mixture of two or more thereof). Mono- or dithiocarbamate compounds include those represented by structure I:

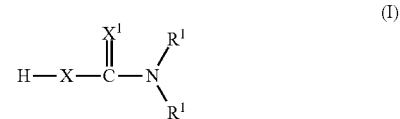

wherein X is sulfur or oxygen, $X^1$ is sulfur or oxygen, provided that at least one of X and $X^1$ is sulfur, and each $R^1$ is independently a hydrocarbyl group that may be substituted with one or more heteroatom-containing substituent groups, provided that the $R^1$ groups together may form an unsubstituted or inertly substituted divalent organic radical that completes a ring structure with the N atom. When only one of X and $X^1$ is sulfur, the compound is a monothiocarbamate. When both X and $X^1$ are sulfur, the compound is a dithiocarbamate.

Mono- or dithiocarbonate compounds include those represented by structure II:

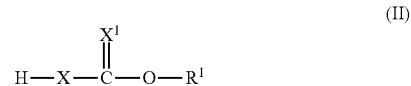

wherein X and $X^1$ are as defined with respect to structure I, and $R^1$ a hydrocarbyl group that may be substituted with one or more heteroatom-containing substituent groups. When only one of X and $X^1$ is sulfur, the compound is a monothiocarbonate. When both X and $X^1$ are sulfur, the compound is a dithiocarbonate.

In structures I and II, the $R^1$ group(s) may be linear, branched and/or cyclic hydrocarbon groups. The $R^1$ groups may be unsaturated or saturated. Thus, the $R^1$ groups may be alkyl, alkenyl, alkynyl, cycloalkyl, aryl, aryl-substituted alkyl, alkyl-substituted aryl and the like. The $R^1$ group(s) each may contain, for example, from 1 to 30, especially from 4 to 18 carbon atoms. The $R^1$ group(s) may contain one or more heteroatom-containing substituents. Those heteroatom-containing substituent(s) preferably do not bond or complex with the bismuth atom. Examples of suitable heteroatom-containing substituents include ether, hydroxyl, carbonate, ester, carbamate, tertiary amine, urea, urethane, imine, halogen and the like.

In structure I and structure III below, the two $R^1$ groups may together form a divalent organic radical that completes a ring structure with the nitrogen atom.

The bismuth salt of the mono- or dithiocarbamate includes those represented by structure III:

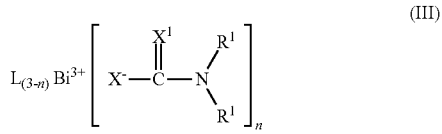

(III)

where X, $X^1$ and $R^1$ are as defined with respect to structure I, n is a number from 1 to 3, and each L is independently an anion other than a mono- or dithiocarbamate anion. The $X^1$ sulfur or oxygen may coordinate to the bismuth atom. n preferably is at least 2 and more preferably is 3.

The bismuth salt of the mono- or dithiocarbonate includes compounds represented by structure IV:

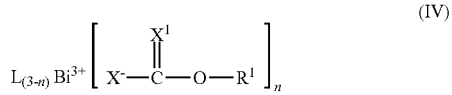

(IV)

where X, $X^1$, $R^1$, L and n are as defined with respect to structure II. As before, the $X^1$ sulfur or oxygen may coordinate to the bismuth atom. n in structure IV may be at least 2 and is 3 in some embodiments.

The L group(s), when present, may be for example, halogen, alkoxide, aryloxy, carboxylate, alkylmercaptide, phenolate, amide, alkylsulfonate, trifluoromethylsulfonate (triflate), bis(trialkylsilyl)amide, hexamethyldisilazide, phosphate or hydrocarbyl. Two or more different anions L may be present.

The bismuth thiophosphoric acid diester salt may be provided in the form of a solution of a suitable solvent such as a hydrocarbon and/or alcohol.

The organic polyisocyanate contains an average of at least 1.5 and preferably at least 2.0 isocyanate groups per molecule. The polyisocyanate(s) may contain an average of as many as 8 isocyanate groups per molecule, but typically contain no more than about 4 isocyanate groups per molecule on average. The organic polyisocyanate may contain as little as 0.5% by weight isocyanate groups, or may contain as much as about 50% by weight isocyanate groups. The isocyanate groups may be bonded to aromatic, aliphatic or cycloaliphatic carbon atoms. Examples of polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, diphenylmethane-2,4'-diisocyanate, diphenylmethane-2,2'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4''-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures of any two or more thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

Any of the foregoing isocyanates can be modified to include urethane, urea, biuret, carbodiimide, allophanate, uretonimine, isocyanurate, amide or like linkages. Examples of modified isocyanates of these types include various urethane group and/or urea group-containing prepolymers, some of which are described in more detail below, so-called "liquid MDI" products, and the like.

A wide range of isocyanate-reactive materials can be used to form the polymer through reaction with the organic polyisocyanate. A suitable isocyanate-reactive material contains at least two hydrogen atoms that are active according to the well-known Zerewitinoff active hydrogen determination test. Isocyanate-reactive groups that contain active hydrogen atoms include aliphatic primary or secondary hydroxyl groups, aromatic hydroxyl groups, aliphatic or aromatic primary or secondary amine groups, thiol (mercapto) groups, carboxylic acid groups, oxirane groups and the like. An isocyanate-reactive material should contain at least two such isocyanate-reactive groups. The isocyanate-reactive groups on a particular isocyanate-reactive material may be all the same, or may be of two or more different types.

Various types of isocyanate-reactive materials can be used. One of these is water, which is considered to be an isocyanate-reactive material for purposes of this invention as it consumes two isocyanate groups to produce a urea linkage, with elimination of a molecule of carbon dioxide.

Another type of isocyanate-reactive material is a high equivalent weight isocyanate-reactive material that has a molecular weight of at least 250 per isocyanate-reactive group. These high equivalent weight isocyanate-reactive materials are commonly used in making flexible and semi-flexible polyurethane and/or polyurea polymers, which may be non-cellular, microcellular or foam materials. These high equivalent weight materials are also used as flexibilizers or tougheners for rigid foamed or non-foamed polyurethane and/or polyurea polymers.

Various types of high equivalent weight isocyanate-reactive materials are useful, including hydroxy-functional acrylate polymers and copolymers, hydroxy-functional polybutadiene polymers, polyether polyols, polyester polyols, amine-terminated polyethers, and various polyols that are based on vegetable oils or animal fats. Polyether polyols include, for example, polymers of propylene oxide, ethylene oxide, 1,2-butylene oxide, tetramethylene oxide, block and/or random copolymers thereof, and the like. Of particular interest for many high-volume applications are poly(propylene oxide) homopolymers, random copolymers of propylene oxide and ethylene oxide in which the oxyethylene content is, for example, from about 1 to about 30% by weight, ethylene oxide-capped poly(propylene oxide) polymers which contain from 70 to 100% primary hydroxyl groups, and ethylene oxide-capped random copolymers of propylene oxide and ethylene oxide in which the oxyethylene content is from about 1 to about 30% by weight. The polyether polyols may contain low amounts of terminal unsaturation (for example, less than 0.02 meq/g or less than 0.01 meq/g), such as those made using so-called double metal cyanide (DMC) catalysts as described for example in U.S. Pat. Nos. 3,278,457, 3,278, 458, 3,278,459, 3,404,109, 3,427,256, 3,427,334, 3,427,335, 5,470,813 and 5,627,120. Polymer polyols of various sorts may be used as well. Polymer polyols include dispersions of polymer particles, such as polyurea, polyurethane-urea, polystyrene, polyacrylonitrile and polystyrene-co-acrylonitrile polymer particles, in a polyol, typically a polyether polyol. Suitable polymer polyols are described in U.S. Pat. Nos. 4,581,418 and 4,574,137.

High equivalent weight isocyanate-reactive polyesters include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols are useful. Polymer polyols of various sorts may be used as well.

High equivalent weight amine-terminated polyethers include polymers and copolymers of propylene oxide, in which all or a portion of the terminal hydroxyl groups are converted to amino groups. The conversion to amino groups can be performed in a reductive amination process in which the polyether is reacted with hydrogen and ammonia or a primary amine. Amine-terminated polyethers of this type are commercially available from Huntsman under the trade name Jeffamine®. Another type of amine-terminated polyether is prepared by capping the terminal hydroxyl groups of a polyether with a diisocyanate to produce an isocyanate-terminated intermediate, and then hydrolyzing the isocyanate-terminal groups to form terminal aromatic amine groups.

High equivalent weight isocyanate-reactive materials based on vegetable oils and/or animal fats include, for example, castor oil, hydroxymethyl group-containing polyols as described in WO 2004/096882 and WO 2004/096883, amide group-containing polyols as described in WO 2007/019063, hydroxyl ester-substituted fatty acid esters as described in WO 2007/019051, "blown" soybean oils as described in US Published Patent Applications 2002/0121328, 2002/0119321 and 2002/0090488, oligomerized vegetable oil or animal fat as described in WO 06/116456, hydroxyl-containing cellulose-lignin materials, hydroxyl-containing modified starches as well as the various types of renewable-resource polyols described in Ionescu, *Chemistry and Technology of Polyols for Polyurethanes*, Rapra Publishers 2005.

Another useful class of isocyanate reactive materials includes polyols and aminoalcohols that contain at least three isocyanate-reactive groups per molecule and have a molecular weight per isocyanate-reactive group of up to 249, preferably from about 30 to about 200. These materials may have up to 8 or more isocyanate-reactive groups per molecule. They most typically include no more than one primary or secondary amino group, and two or more primary or secondary hydroxyl groups. This class of isocyanate-reactive materials includes materials that are commonly known as crosslinkers or (because they are commonly used in making rigid polyurethane foams) "rigid polyols". Examples of isocyanate-reactive materials of this type include diethanolamine, triethanolamine, di- or tri(isopropanol) amine, glycerin, trimethylol propane, pentaerythritol, various polyester polyols that have at least three hydroxyl groups per molecule and an equivalent weight of up to 249, and various low equivalent weight polyether polyols that have at least three hydroxyl groups per molecule. The low equivalent weight polyether polyols include, for example, ethoxylates and/or propoxylates of an aromatic diamine such as toluene diamine and phenylene diamine, an aliphatic diamine such as ethylene diamine, cyclohexanedimethanol and the like, or a polyol having at least three hydroxyl groups, such as, for example, glycerin, sucrose, sorbitol, pentaerythritol, trimethylolpropane, trimethylolethane and the like.

Another class of suitable isocyanate-reactive materials includes chain extenders, which for the purposes of this invention means a material having exactly two isocyanate-reactive groups per molecule and an equivalent weight per isocyanate-reactive group of up to 249, especially from 31 to 125. The isocyanate reactive groups are preferably hydroxyl, primary aliphatic or aromatic amine or secondary aliphatic or aromatic amine groups. Representative chain extenders include ethylene glycol, diethylene glycol, triethylene glycol, 1,2-propylene glycol, 1,3-propylene glycol, 1,4-butane diol, 1,6-hexane diol, neopentyl glycol, dipropylene glycol, tripropylene glycol, poly(propylene oxide) diols of up to 249 equivalent weight, cyclohexanedimethanol, poly(ethylene oxide) diols of up to 249 equivalent weight, aminated poly (propylene oxide) diols of up to 249 equivalent weight, ethylene diamine, phenylene diamine, diphenylmethane diamine, bis(3-chloro-4-aminophenyl)methane and 2,4-diamino-3,5-diethyl toluene. A mixture of chain extenders may be used.

The relative amounts of polyisocyanate and isocyanate-reactive materials provided to the reaction mixture are selected to produce a high molecular weight polymer. The ratio of these components is typically expressed as "isocyanate index" which for purposes of this invention means 100 times the ratio of the equivalents of isocyanate groups provided by the isocyanate-reactive materials to the equivalents of isocyanate-reactive groups provided by the isocyanate-reactive materials. The isocyanate index is typically at least 50, and may be up to 1000 or more. When flexible or semiflexible cellular, microcellular or non-cellular polymers are prepared, the isocyanate index is generally from 70 to about 150 and more typically from about 70 to 125. Tighter ranges may be used in specific cases. Rigid polymers such as structural polyurethanes and rigid foams are typically made using an isocyanate index of from 90 to 200. Polymers containing isocyanurate groups are often made at isocyanate indices of at least 150, up to 600 or more.

The reaction of the polyisocyanate with the isocyanate-reactive materials may be performed all at once (a "one-shot" process), or can be conducted in stages through the formation of an isocyanate-terminated prepolymer or quasi-prepolymer which is then reacted with additional isocyanate-reactive material(s) to form the final polymer. The catalyst of the invention can be present during the formation of a prepolymer or quasi-prepolymer, during the reaction of the prepolymer or quasi-prepolymer to form a final polymer, or both stages.

The bismuth salt is present in an amount sufficient to provide a commercially acceptable polymerization rate. A typical amount is from 0.01 to 3 millimoles of the bismuth salt per kilogram of reactants (i.e., the polyisocyanate(s) and isocyanate-reactive materials) present in the polymerization process, although amounts may vary depending on the particular polymerization process and the particular reactants that are present. A preferred amount is from 0.05 to 1 millimole of bismuth salt per kilogram of reactants, and a more preferred amount is from 0.075 to 0.5 millimole of bismuth salt per kilogram of reactants.

When used by itself, the bismuth salt provides for a long open time and a long cure time. It has been found that the cure time can be reduced very substantially by including certain activator compounds in the formulation. Useful activators include aluminosilicates such as molecular sieves and zeolites, as well as various inorganic or organic bases. Suitable inorganic bases include alkali metal salts of weak acids. An example of such an inorganic base is a sodium or potassium salt of a dithiophosphoric acid diester, such as sodium dithiophosphoric acid di(n-hexyl) ester.

A preferred type of organic base activator is a compound that contains one or more tertiary amino groups.

Representative tertiary amine-containing activator compounds include but are not limited to 1,8-diaminonaphthalene, trimethylamine, triethylamine, dimethylethanolamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, tetramethylguanidine, 1,4-diazobicyclo-2,2,2-octane, bis(dimethylaminoethyl)ether, bis(2-dimethylaminoethyl)ether, morpholine, 4,4'-(oxydi-2,1-ethanediyl)bis, triethylenediamine, pentamethyl diethylene triamine, dimethyl cyclohexyl amine, N-cetyl-N,N-dimethyl amine, N-coco-morpholine, N,N-dimethyl aminomethyl N-methyl ethanol amine, N,N,N'-trimethyl-N'-hydroxyethyl bis(aminoethyl)ether, N,N-bis(3-dimethylaminopropyl)N-isopropanolamine, (N,N-dimethyl) amino-ethoxy ethanol, N,N,N',N'-tetramethyl hexane diamine, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine.

A preferred type of tertiary amine-containing activator compound is an amidine compound, which may be acyclic or cyclic. The amidine compound contains at least one —N=C—N< group, which may be incorporated into a cyclic structure. This class of catalysts includes cyclic amidines such as 2,3-dimethyltetrahydropyridimine, and bicyclic amidines such as 1,8-diazabicyclo-5.4.0-undecene-7,1,5-diazobicyclo-4.3.0-nonene-5,6-dibutylamino-1,8-diazabicyclo-5.4.0-undecene-7 and other substituted bicyclic amidine compounds.

Any of the foregoing tertiary amine catalysts, and the amidine catalysts in particular, may be present in the form of a salt, particularly a phenolate and/or carboxylate salt.

Tertiary amine compounds are known to catalyze the reactions of isocyanate groups with alcohols. In this invention, it is preferred that any tertiary amine activator compound or compounds be present in very small amounts, at which the tertiary amine compound exhibits very little if any catalytic activity. A tertiary amine activator compound may be present, for example, in an amount ranging from 0.1 to 10 moles per mole of the bismuth salt, but not more than 10 millimoles of tertiary amine activator per kilogram of reactants. A more preferred amount is from 0.5 to 5 moles of tertiary amine activator per mole of the bismuth salt, and a still more preferred amount is from 0.5 to 3 moles of tertiary amine activator per mole of the bismuth salt, but in each case not more than 10 millimoles of tertiary amine activator per kilogram of reactants. It is more preferred that no more than 5 millimoles of tertiary amine catalyst compound(s), especially not more than 1 millimole of tertiary amine activator compound(s), are present per kilogram of reactants.

Activators that do not possess catalytic activity may be present in larger amounts, such as up to about 5% by weight, preferably up to about 3% by weight, based on the weight of the reactants.

A wide variety of polymers can be made in accordance with the invention, through the proper selection of particular polyisocyanates, isocyanate-reactive materials, the presence of optional materials such as are described below, and reaction conditions. The process of the invention can be used to produce polyurethane and/or polyurea polymers of various types, including cast elastomers, flexible or semi-flexible reaction injection molded parts (which may be reinforced and/or contain fillers), rigid structural composites which contain reinforcements and/or fillers, flexible polyurethane foams, which may be made in slabstock and/or molding processes, rigid polyurethane foams, sealants and adhesives (including moisture-curable types), binders such as for polymer concrete or for cushioning material such as playground or sports surfaces, mats and the like, cushion and/or unitary backings for carpet and other textiles, semi-flexible foams, pipe insulation, automotive cavity sealing, automotive noise and/or vibration dampening, microcellular foams such as shoe soles, tire fillers, and the like. Processes for making polyurethane and/or polyureas of all of these types are well known; conventional processing methods for making these products are entirely suitable for use with this invention.

Depending on the particular type of polymer being produced and the needed attributes of the polymer, a wide variety of additional materials may be present during the reaction of the isocyanate compound with the isocyanate-reactive materials. Among these materials are surfactants; blowing agents; cell openers; fillers; pigments and/or colorants; desiccants, reinforcing agents; biocides; preservatives; antioxidants; flame retardants; and the like.

One or more surfactants may be present, especially when some blowing agent is incorporated into the formulation. A surfactant can help to stabilize the cells of the composition as gas evolves to form bubbles. A surfactant can also help to wet filler particles and in that way make it easier to incorporate them into the system. Examples of suitable surfactants include alkali metal and amine salts of fatty acids, such as sodium oleate, sodium stearate, diethanolamine oleate, diethanolamine stearate, diethanolamine ricinoleate and the like; alkali metal and amine salts of sulfonic acids such as dodecylbenzenesulfonic acid and dinaphthylmethanedisulfonic acid; ricinoleic acid; siloxane-oxyalkylene polymers or copolymers and other organopolysiloxanes; oxyethylated alkylphenols (such as Tergitol NP9 and Triton X100, from The Dow Chemical Company); oxyethylated fatty alcohols such as Tergitol 15-S-9, from The Dow Chemical Company; paraffin oils; castor oil; ricinoleic acid esters; turkey red oil; peanut oil; paraffins; fatty alcohols; dimethyl polysiloxanes and oligomeric acrylates with polyoxyalkylene and fluoroalkane side groups. These surfactants are generally used in amounts of 0.01 to 2 parts by weight based on 100 parts by weight of the polyols. Organosilicone surfactants are generally preferred types. Examples of commercially available surfactants that are useful include Dabco™ DC2585, Dabco™ DC5043 and Dabco™ DC5180 surfactants, available from Air Products, Niax™ U-2000 surfactant, available from GE OSi Silicones, and Tegostab™ B 8681, Tegostab™ B4351, Tegostab™ B8631, Tegostab™ B8707 and Tegostab™ B8715 surfactants, available from Th. Goldschmidt.

A blowing agent may be present if it is desired to form a cellular or microcellular polymer. Water, which is an isocyanate-reactive material, also functions as a blowing agent if present in sufficient quantities, because it reacts with isocyanate groups to liberate carbon dioxide, which then serves a blowing gas. However, other chemical and/or physical blowing agents can be used instead of or in addition to water. Chemical blowing agents react under the conditions of the elastomer-forming step to produce a gas, which is typically carbon dioxide or nitrogen. Physical blowing agents volatilize under the conditions of the polymer-forming step. Suitable physical blowing agents include various low-boiling chlorofluorocarbons, fluorocarbons, hydrocarbons and the like. Fluorocarbons and hydrocarbons having low or zero global warming and ozone-depletion potentials are preferred among the physical blowing agents.

In addition, a gas such as carbon dioxide, air, nitrogen or argon may be used as the blowing agent in a frothing process.

The amount of blowing agent can vary considerably, depending on the particular blowing agent used and the desired density of the resulting polymer.

Cell openers are often present in flexible foam formulations. Cell openers include high molecular weight (generally 4000-20,000 MW) polyethers, typically having ethylene oxide contents of at least 40%, preferably at least 50% by weight.

One or more fillers may also be present. A filler may help modify the composition's rheological properties in a beneficial way, reduce cost and impart beneficial physical properties to the polymer. Suitable fillers include particulate inorganic and organic materials that are stable and do not melt at the temperatures encountered during the polyurethane-forming reaction. Examples of suitable fillers include kaolin, montmorillonite, calcium carbonate, wollastonite, talc, high-melting thermoplastics, glass, fly ash, carbon black, titanium dioxide, iron oxide, chromium oxide, azo/diazo dyes, phthalocyanines, dioxazines, colloidal silica and the like. The filler may impart thixotropic properties. Fumed silica is an example of such a filler. When used, fillers advantageously constitute from about 0.5 to about 30%, especially about 0.5 to about 10%, by weight of the polymer.

Some of the foregoing fillers may also impart color to the polymer. Examples of these include titanium dioxide, iron oxide, chromium oxide and carbon black. Other colorants such as azo/diazo dyes, phthalocyanines and dioxazines also can be used.

Reinforcing agents may also be present. The reinforcing agents take the form of particles and/or fibers that have an aspect ratio (ratio of longest dimension to shortest dimension) of at least 3, preferably at least 10. Examples of reinforcing agents include mica flakes, fiber glass, carbon fibers, boron or other ceramic fibers, metal fibers, flaked glass and the like. Reinforcing agents may be formed into mats or other preformed masses.

It is also possible to include one or more catalysts for the reaction of an isocyanate group with an alcohol, primary amine or secondary amine group, in addition to the bismuth mono- or dithiocarbamate or mono- or dithiocarbonate salt.

Suitable such additional catalysts include, for example:
i) certain tertiary phosphines such as a trialkylphosphine or dialkylbenzylphosphine;
ii) certain chelates of various metals, such as those which can be obtained from acetylacetone, benzoylacetone, trifluoroacetyl acetone, ethyl acetoacetate and the like, with metals such as Be, Mg, Zn, Cd, Pd, Ti, Zr, Al, Sn, As, Bi, Cr, Mo, Mn, Fe, Co and Ni;
iii) certain acidic metal salts of strong acids, such as ferric chloride, stannic chloride, stannous chloride, antimony trichloride, bismuth nitrate and bismuth chloride;
strong bases, such as alkali and alkaline earth metal hydroxides, alkoxides and phenoxides;
(iv) certain alcoholates or phenolate of various metals, such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino)alcohols;
(v) certain alkaline earth metal, Bi, Pb, Sn or Al carboxylate salts; and
(vi) certain tetravalent tin compounds, and certain tri- or pentavalent bismuth, antimony or arsenic compounds.

In some embodiments, the bismuth salt is the sole metal-containing catalyst in the formulation. In other embodiments, the bismuth salt is the sole catalyst in the formulation.

The processing method used to make the polymer is not considered to be critical to the invention, provided that the isocyanate compound and the isocyanate-reactive material(s) are mixed and cured in the presence of the bismuth salt to form the polymer. The curing step is achieved by subjecting the reaction mixture to conditions sufficient to cause the isocyanate compound and isocyanate reactive material(s) to react to form the polymer.

Thus, for example, flexible and semi-flexible polyurethane foam can be made in accordance with the invention in a slabstock or molding process. Flexible polyurethane foams are typically made using one or more polyols having an equivalent weight per hydroxyl group of at least 500 to about 2200. Enough blowing agent is used to produce a foam having a density of from 1 to 8 pounds/cubic foot (16-128 kg/m$^3$), preferably from 1.5 to 4 pounds/cubic foot (24-64 kg/m$^3$). Water is a preferred blowing agent. Mixtures of water and a physical blowing agent can be used. A crosslinker and/or chain extender are often present, preferably a polyol or aminoalcohol crosslinker having a molecular weight per isocyanate reactive group of from about 30 to about 75. Isocyanate indices for making flexible polyurethane foam are typically from 70 to 125, more typically from 85 to 115.

Slabstock foam is conveniently prepared by mixing the foam ingredients and continuously dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and continuously dispensed onto a conveyor that is lined with paper or plastic. Foaming and curing occurs on the conveyor to form a foam bun. High resilience slabstock (HR slabstock) foam is made using methods similar to those used to make conventional slabstock foam. HR slabstock foams are characterized in exhibiting a Bashore rebound score of 55% or higher, per ASTM 3574-03.

Molded foam can be made according to the invention by mixing the foam ingredients and transferring the resulting reaction mixture to a closed mold where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred to produce high resiliency molded foam.

Rigid polyurethane foam can be made in accordance with the invention. Rigid foam can be made in a pour-in-place process, as is often the case when the foam forms a thermal insulation layer in an appliance, cooler or other structure. Rigid foam also can be produced using pouring processes or sheet-forming processes. Rigid polyurethane foams are typically made using polyols and/or aminoalcohols having an average equivalent weight per hydroxyl group of at from about 40 to about 250, preferably from about 50 to about 125. Enough blowing agent is used to produce a foam having a density of from 1 to 8 pounds/cubic foot (16-128 kg/m$^3$), preferably from 1.5 to 4, pounds/cubic foot (24-64 kg/m$^3$). Water is a preferred blowing agent. Mixtures of water and a physical blowing agent can be used. Isocyanate indices for making rigid polyurethane foam are typically from 90 to 200. Indices of from 150 to 600 are often used when isocyanurate foams are to be produced.

Noncellular flexible and semi-flexible polyurethane and/or polyurea molded polymers can be made using various molding processes such as reaction injection molding, so-called SRIM or RRIM processes, various spray molding methods, and the like. In these systems, the isocyanate-reactive material is typically a mixture that includes one or more polyols and/or polyamines having a molecular weight per isocyanate-reactive group of at least 500, preferably at least 1200, to about 3000, preferably to about 2500, and at least one chain extender. Blowing agents are usually absent or used in very small amounts, so that the density of the resulting polymer is at least 500 kg/m$^3$. Isocyanate indices are typically from 90 to 125, preferably from 95 to 115.

The bismuth salt, or mixture of the bismuth salt and activator compound, is especially useful in processes in which a delayed cure is needed due to processing constraints or for other reasons. Examples of these processes include certain sealant and adhesive applications, certain carpet backing or other textile-backing applications, and certain cast elastomer processes. Sealants and adhesives are often required to have an "open time" of 2 to 60 minutes or more, to allow the material to be dispensed and the substrate(s) brought into position. Similarly, an open time is often required in carpet backing and other textile backing processes, because the reaction mixture must remain flowable long enough for it to be spread across the surface of the carpet or textile and gauged to a needed thickness. Cast elastomer processes often need a significant open time to allow for degassing or frothing, if desired, and mold filling. In all of these processes, it is preferable to obtain a rapid cure after the necessary open time has passed. In such processes, the bismuth salt preferably is the sole metal-containing catalyst (other than, optionally, an organic base activator in amounts as described before).

Carpet and other textile cushion backings can be made in accordance with the invention via a mechanical frothing process. In such processes, air, nitrogen or other gas is whipped into the reaction. The frothed reaction mixture is then typically applied to a substrate where it is permitted to cure to form an adherent cellular layer. Such textile-backing processes are described, for example, in U.S. Pat. Nos. 6,372,810 and 5,908,701.

Cast elastomers are generally made using a prepolymer or quasi-prepolymer as the isocyanate-reactive compound. The prepolymer or quasi-prepolymer is prepared by reacting an excess of a polyisocyanate with at least one polyol that has a molecular weight of at least 400, preferably at least 800. The polyol(s) may have a molecular weight as high as about 12,000. A preferred molecular weight is up to 4000 and a more preferred molecular weight is up to 2000. The polyol(s) used in making the prepolymer or quasi-prepolymer preferably have an average of from 1.8 to 3.0, preferably from 1.8 to 2.5 and still more preferably about 1.9 to 2.2 hydroxyl groups per molecule. A preferred polyol for this application is an ethylene oxide-terminated polypropylene oxide diol or triol, or a mixture thereof with at least one poly(propylene oxide) homopolymer diol or triol.

A low (up to 300) molecular weight diol may be used to make the prepolymer or quasi-prepolymer, in addition to the foregoing ingredients. This low molecular weight diol preferably has a molecular weight of from 62 to 200. Examples of the low molecular weight diol include ethane diol, 1,2- or 1,3-propane diol, diethylene glycol, dipropylene glycol, triethylene glycol, tripropylene glycol, cyclohexanedimethanol, and the like. This material is usually used in small amounts, if at all. If used in making the prepolymer or quasi-prepolymer, from 1 up to 25 parts by weight thereof may be used per 100 parts by weight of the polyol(s) that have a molecular weight of 400 or more.

The polyisocyanate used to make the prepolymer or quasi-prepolymer preferably contains an average of from 1.8 to 3.5, more preferably from 1.8 to 2.5 isocyanate groups per molecule and an isocyanate content of at least 25% by weight. Aliphatic polyisocyanates are preferred when light stability is needed. In other cases, TDI, MDI, polymeric MDI or an MDI derivative is often useful. MDI may be the 2,2'-, 2,4'- or 4,4'-isomer, with the 4,4'-isomer, or mixtures of the 4,4'- and 2,4'-isomer, being preferred. "Derivatives" of MDI are MDI that has been modified to include urethane, urea, biuret, carbodiimide, uretonimine or like linkages, and which have an isocyanate content of at least 25% by weight.

At least two equivalents of the polyisocyanate are used per equivalent of the diol(s) to make a prepolymer. More than two equivalents of the polyisocyanate, typically at least 2.2 equivalents, are used per equivalent of the diol(s) used to make a quasi-prepolymer. The resulting product includes molecules formed by capping the diol(s) with the polyisocyanate and, in the case of quasi-prepolymer, some quantity of unreacted polyisocyanate. The prepolymer or quasi-prepolymer should have an isocyanate content of at least 4%, and preferably at least 8% by weight. The isocyanate content should not exceed 20% and preferably does not exceed 18% by weight. The prepolymer or quasi-prepolymer should contain an average of from about 1.9 to about 2.5, preferably from 1.9 to 2.3 and more preferably from 2.0 to 2.2 isocyanate groups per molecule.

The reaction to produce the prepolymer or quasi-prepolymer can be catalyzed. The catalyst may be a bismuth salt in accordance with this invention, or mixture thereof with an activator compound.

A cast elastomer is formed by mixing the prepolymer or quasi-prepolymer with a chain extender and/or mixture of chain extender and at least one polyol having a molecular of at least 400, as described with respect to the prepolymer or quasi-prepolymer, and allowing the mixture to cure in the presence of the bismuth thiophosphoric acid diester salt (or bismuth salt/activator mixture) in a mold. The mold may be open or closed.

The chain extender may constitute from 2 to 100%, preferably from 4 to 50 and still more preferably from 4 to 25%, of the combined weight of the combined weight of chain extender(s) and polyols having a hydroxyl equivalent weight of at least 250.

To prepare the cast elastomer, the starting materials are generally mixed in ratios that produce an isocyanate index of at least 70 to about 130. A preferred isocyanate index is from 80 to 120, and a more preferred index is from 90 to 110.

The curing conditions are not generally considered to be critical provided that the mixture cures adequately. The components or the mixture may be preheated before being introduced into the mold. The mold may be preheated. It is usually necessary to cure the mixture at elevated temperature; for that reason the filled mold is generally heated in an oven or other suitable apparatus. Mold temperatures may be from 40 to 90° C. Curing times can range from as little as one minute to 60 minutes or more. After curing at least to the extent that the resulting elastomer can be removed from the mold without permanent damage or permanent deformation, the part can be demolded. If necessary, the part can be post-cured at an elevated temperature to complete the cure.

The elastomer will of course take the shape of the internal cavity of the mold; therefore the mold is designed to produce a part having the desired external shape and dimensions. A wide range of elastomeric parts can be produced, including gaskets, bushings, wheels, belts, and the like. However, shoe soles are an application of particular interest. The shoe sole may be, for example, a midsole, an insole, and outsole, or an integrated sole that performs two or more of these functions.

The cast elastomer may be produced at a density of as low as about 300 kg/m$^3$, preferably at least 500 kg/m$^3$ by frothing the reaction mixture before curing it, or by including a blowing agent in the formulation. Microcellular cast elastomer made in such a way can be used, for example, as shoe soles. Suitable frothing methods are described in U.S. Pat. Nos. 3,755,212, 3,849,156 and 3,821,130. Substantially non-cellular cast elastomers may be produced using no blowing agent or frothing.

In cast elastomer processes, the bismuth salt often provides a long open time followed by a rapid cure. The physical properties of the resulting elastomer are often comparable to those obtained using conventional mercury catalysts.

The bismuth catalyst of the invention has the further advantage of being having good stability in a polyol mixture. This is a very important advantage because it is common in the polyurethanes industry to produce formulated polyol mixtures that contain the catalyst(s), and to store those formulated polyol mixtures for a period of time ranging from a few hours or from about one day to up to several months. Thus, the bismuth catalyst of this invention can be blended with one or more isocyanate-reactive compounds, preferably one or more polyols, to form a formulated polyol mixture, which is then stored for a day or more before being reacted with the polyisocyanate to form a polymer.

It is also possible to blend the bismuth catalyst of the invention into a polyisocyanate to produce a formulated polyisocyanate mixture that contains the catalyst. Such a formulated polyisocyanate mixture also has good stability, and can be stored for a period of time ranging from a few hours or from up about one day up to several months.

The following examples are provided to illustrate the invention but are not intended to limit the scope thereof. All parts and percentages are by weight unless otherwise indicated.

Examples 1 and 2 Comparative Samples A and B

A catalyst solution is prepared by dissolving 0.2 parts of bismuth (III) tris(di-n-hexyldithiocarbamate) in 0.8 parts of tripropylene glycol and 1 part of 3,7-dimethyloctanol.

Example 1

A masterbatch of 7774 parts of a 6000 molecular weight, ethylene oxide-capped poly(propylene oxide) triol, 1078 parts of 1,4-butane diol and 177 parts of an aluminosilicate molecular sieve paste is blended in a mechanical mixer. A 66.6 part sample of this masterbatch is dispensed into a plastic cup suitable for use on a FlakTex Speedmixer. 0.43 parts of the catalyst solution are added to the masterbatch, and the mixture is mixed on the Speedmixer for 90 seconds. Then, 34.5 parts of a modified MDI having an isocyanate functionality of about 2.1 is mixed into the polyol mixture for 60 seconds. The reaction mixture is then poured into a steel plaque mold that is sprayed with an external mold release and preheated to 80° C. Tack-free and demold times are measured. Tack-free time is the time after pouring at which the composition no longer sticks to a metal spatula touched to its surface. Demold time is the amount of time necessary before the part can be demolded without damage. Following demold, the parts are postcured for 1 hour at 80° C. in a forced air oven and allowed to sit for one day at room temperature. Tensile properties and Shore A hardness are then measured according to ASTM D7108. Results are as indicated in Table 1.

Example 2

This sample is made in the same manner as Example 1 except the amount of catalyst solution is increased to 0.59 parts. Results are as indicated in Table 1.

Comparative Sample A:

Comparative Sample A is made in the same general manner as Example 1, except the catalyst is 0.18 parts of a titanium catalyst complex sold commercially as Snapcure™ 2210 by Alfa Aesar, a Johnson Matthey company.

Comparative Sample B is prepared by mixing 7 g of the polyol masterbatch with 50 microliters of a solution of 25.8 millimoles of bismuth tris(dodecylmercaptan) in 4 mL toluene. This provides 0.323 millimoles of catalyst. About 3.5 g of a 160.1 isocyanate equivalent weight uretonimine-modified diphenylmethane diisocyanate that has an average of 2.1 isocyanate groups per molecule is added. This time is designated t=0. The resulting mixture is stirred at room temperature for two minutes forty-five seconds, and then poured into a preheated (80° C.) pan to form a layer 2 mm thick. Tack-free time is evaluated by periodically touching the top of the reaction mixture with a spatula. The tack-free time is the time at which no material sticks to the spatula. The sample is aged at 80° C. for one hour and its Shore A hardness is measured.

Results of the testing are indicated in Table 1.

TABLE 1

| Property | Example 1 | Example 2 | Comp. Sample A | Comp. Sample B |
| --- | --- | --- | --- | --- |
| Catalyst | Bi tris(di-n-hexyl dithio-carbamate) | Bi tris(di-n-hexyl dithio-carbamate) | Titanium | Bi tris-(dodecyl mercaptan) |
| Catalyst amount, mmol/kg reactants | 0.43 | 0.59 | ND | 31 |

TABLE 1-continued

| Property | Example 1 | Example 2 | Comp. Sample A | Comp. Sample B |
|---|---|---|---|---|
| Tack-free time, minutes:seconds | 6 | 5:20 | 4 | 9 |
| Demold time, minutes:seconds | 16 | 9 | 5:30 | 12:30 |
| 100% Modulus, MPa | 20.8 | 18.6 | 21.5 | ND |
| Tensile strength, MPa | 16.5 | 18.8 | 17.4 | ND |
| Elongation at break, % | 383 | 429 | 347 | ND |
| Shore A Hardness | 89 | 89 | 87 | 80-85 |

ND = not determined.

The bismuth dithiocarbamate salt provides a long open time followed by a rapid cure. Cure is faster at the higher concentration of bismuth dithiocarbamate salt, at the expense of some pot time (as indicated by the tack-free time). The physical properties of Examples 1 and 2 are comparable to those provided by the titanium catalyst (Comparative Sample A). The bismuth mercaptide catalyst (Comp. Sample B) provides very long tack-free times and a softer polymer under this test.

Example 3

A catalyst solution is prepared by dissolving 0.2 parts of bismuth (III) tris(octyl dithiocarbonate) in 0.8 parts of tripropylene glycol and 1 part of 3,7-dimethyloctanol. An elastomer is made in the same manner as described with respect to Example 1, substituting 0.18 g of this catalyst solution for that used in Example 1. Properties are measured as described with respect to Example 1. Results are as indicated in Table 2.

TABLE 2

| Property | Example 1 |
|---|---|
| Catalyst | Bi tris(octyl xanthate) |
| Catalyst amount, mmol/kg reactants | 0.22 |
| Tack-free time, minutes | 5.3 |
| Demold time, minutes | 9 |
| 100% Modulus, MPa | 23.2 |
| Tensile strength, MPa | 18.0 |
| Elongation at break, % | 396 |
| Shore A Hardness | 89 |

The bismuth dithiocarbonate catalyst provides a long open time followed by a rapid cure, and produces a polymer having properties very similar to those of Comparative Sample A.

Examples 4-10 and Comparative Samples C-E

A polyol mixture is formed from 0.819 parts of 1,4-butanediol and 6.181 g of a 6000-molecular weight, nominally trifunctional polyether polyol obtained by adding propylene oxide and then ethylene oxide to glycerin in the presence of potassium hydroxide catalyst. 2% by weight of an aluminosilicate molecular sieve paste are added. A catalyst solution is prepared by dissolving bismuth tris(dihexyl dithiocarbamate) in enough toluene to produce a catalyst solution containing 10 mg of catalyst per mL of solvent.

7 g of this polyol mixture are weighed into a vial. For Example 4, 50 microliters of the catalyst solution is added to the vial and mixed in. About 3.5 g of a 160.1 isocyanate equivalent weight uretonimine-modified diphenylmethane diisocyanate that has an average of 2.1 isocyanate groups per molecule is added. This time is designated t=0. The resulting mixture is stirred at room temperature for one minute. The vial contents are then visually monitored. Tack-free time is evaluated by periodically touching the top of the reaction mixture with a spatula. The tack-free time is the time at which no material sticks to the spatula. Results are as indicated in Table 3.

Examples 5 and 6 are prepared in the same manner, except the amount of catalyst solution in Examples 5 and 6 are 1 mL and 1.5 mL, respectively. Whitening and tack-free times for Examples 5 and 6 are indicated in Table 3.

Plaques are also made from the Example 6 formulation, by adding the catalyst solution to the polyol mixture, stirring in the polyisocyanate for one minute and pouring the reaction mixture onto a 70 mm circular aluminum pan on an 80° C. hot plate. Tack-free time is evaluated as before. Results are in indicated in Table 3.

Example 7 is prepared in the same manner as Example 4, except the molecular sieves are omitted and the amount of catalyst is increased as indicated in Table 3.

Examples 8-10 are prepared in the same manner as Example 4, except the molecular sieves are replaced with varying amounts of a zeolite which is dried overnight at 300° C.), and the amount of catalyst is changed as indicated in Table 3.

Comparative Samples C and D each are the same as Example 7, except the catalyst in each case is 0.25 micromoles of bismuth tris(2-ethyl hexanoate). In Sample C, the catalyst is blended with the polyol mixture, and the mixture is then held for about 2 hours at room temperature before adding the polyisocyanate. In Sample E, the catalyst is blended with the polyol mixture, which is then held for about 20 hours at room temperatures before adding the polyisocyanate. Comparative Sample E is the same as Comparative Sample E, except 82 mg of a zeolite are present.

TABLE 3

| Example No. | Bi catalyst type | Bi catalyst (mmol/kg reactants) | Activator Type | Activator Amount | Tack-free time (min:sec) |
|---|---|---|---|---|---|
| 4 | tris (dihexyl dithiocarbamate) | 0.048 | Molecular Sieves | 2 wt-% | 12:20 |
| 5 | tris (dihexyl dithiocarbamate) | 0.096 | Molecular Sieves | 2 wt-% | 7:36 |
| 6 | tris (dihexyl dithiocarbamate) | 0.144 | Molecular Sieves | 2 wt-% | 6:15 |
| 6 (plaque, 80° C.) | tris (dihexyl dithiocarbamate) | 0.144 | Molecular Sieves | 2 wt-% | 3:40 |
| 7 | tris (dihexyl dithiocarbamate) | 0.190 | None | 0 | >20 |
| 8 | tris (dihexyl dithiocarbamate) | 0.190 | Zeolite | 22 mg | 8:45 |
| 9 | tris (dihexyl dithiocarbamate) | 0.190 | Zeolite | 62 mg | 6:40 |
| 10 | tris (dihexyl dithiocarbamate) | 0.190 | Zeolite | 117 mg | 6:50 |
| Comp. Sample C | tris(2-ethyl hexanoate) | 0.024 | None | 0 | 6:40 |
| Comp. Sample D | tris(2-ethyl hexanoate) | 0.024 | None | 0 | 11:00 |
| Comp. Sample E | tris(2-ethyl hexanoate) | 0.024 | Zeolite | 82 mg | 6:40 |

Example 7 shows that the bismuth dithiocarbamate catalyst provides a very slow cure in the absence of an activator. Examples 4-10 show the effect of activators (molecular sieves or zeolite) and varying catalyst level. In the presence of the activator, the bismuth dithiocarbamate catalyst provides effective curing even at low levels. Comparative Samples C-E demonstrate the performance of a conventional bismuth carboxylate catalyst. That catalyst cures the mixture even without an activator (Comp. Sample C). However, the catalyst deactivates upon standing in a polyol mixture, as shown by the long tack-free time of Comparative Sample D, in which the catalyst/polyol blend is stored for less than a day before curing the mixture. In addition, the bismuth carboxylate catalyst performance is not affected by the presence of an activator (Comparative Sample E). Therefore, the performance of this bismuth carboxylate catalyst cannot be "tuned" using activator compounds, as can the bismuth catalysts of this invention.

Examples 11-13

A catalyst solution is prepared by dissolving bismuth tris (octyl dithiocarbonate) in enough toluene to produce a solution containing 10 mg of catalyst per mL of solvent. Examples 11-13 are made in the same manner as described with respect to Example 4. In Example 11, enough of this solution is added to provide 0.25 mg of the catalyst. In Examples 12 and 13, enough of the solution to provide 1.1 and 2 mg of the catalyst, respectively, is added. A plaque also is made from the Example 11, in the manner described with respect to Example 6. Tack-free times are measured, and are as indicated in Table 4.

TABLE 4

| Example No. | Bi catalyst (mg) | Bi catalyst (mmol/kg reactants) | Tack-free time (min |
|---|---|---|---|
| 11 | 0.25 | 0.029 | 9.2 |
| 11 (plaque, 80° C.) | 0.25 | 0.029 | 3.7 |
| 12 | 1.1 | 0.127 | 3.4 |
| 13 | 2 | 0.231 | 4.8 |

Examples 14-17

A polyol mixture is formed from 0.819 parts of 1,4-butanediol and 6.181 g of a 6000-molecular weight, nominally trifunctional polyether polyol obtained by adding propylene oxide and then ethylene oxide to glycerin in the presence of potassium hydroxide catalyst.

Catalyst Solution A contains bismuth tris(dihexyl dithiocarbamate) in enough toluene to produce a solution that contains 10 mmoles of the catalyst per liter of solution. Catalyst solution B is a toluene solution that contains 10 mmoles of bismuth tris(octyl dithiocarbonate) per liter.

Example 14

7 g of the polyol mixture is weighed into a vial. 200 microliters of Catalyst Solution A are added to the vial and mixed in. About 3.5 g of a 160.1 isocyanate equivalent weight uretonimine-modified diphenylmethane diisocyanate that has an average of 2.1 isocyanate groups per molecule is added. This time is designated t=0. The resulting mixture is stirred at room temperature for 30 seconds. The vial contents are then visually monitored. As the mixture begins to cure, an opaque area first forms at the surface of the mixture. The time at which this area first forms is designated as the "whitening time". Tack-free time is evaluated by periodically touching the top of the reaction mixture with a spatula. The tack-free time is the time at which no material sticks to the spatula. Results are as indicated in Table 5.

Example 15 is the same as Example 14, except that 60 microliters of a 1,8-diazabicyclo[5.4.0]undec-7-ene (DBU) solution in toluene is added. This DBU solution contains 33.5 millimoles DBU per liter of solution.

Examples 16 and 17 are the same as Examples 14 and 15, respectively, except Catalyst Solution A is replaced with 100 microliters of Catalyst Solution B in each case.

Whitening and tack-free times for each of Examples 14-17 are as indicated in Table 5.

TABLE 5

| Ex. No. | Bi Catalyst Type | Amount (mmol/kg of reactants) | DBU (mmol/kg of reactants) | Whitening Time, min:sec | Tack-free Time, min:sec |
|---|---|---|---|---|---|
| 14 | bismuth tris(dihexyl dithiocarbamate) | 0.190 | 0 | 8 | >20 |
| 15 | bismuth tris(dihexyl dithiocarbamate) | 0.190 | 0.191 | 5:30 | 7:50 |
| 16 | Bismuth tris(octyl dithiocarbonate) | 0.095 | 0 | 9:30 | >20 |
| 17 | Bismuth tris(octyl dithiocarbonate) | 0.095 | 0.191 | 6:15 | 8:50 |

As can be seen from the data in Table 5, the bismuth salts by themselves provide very slow cures. The addition of the tertiary amine (DBU) in very small amounts leads to a significant decrease in cure times. At the small amounts present in Examples 15 and 17, DBU by itself provides tack-free times in excess of 20 minutes. Therefore, the reduction in cure times seen in Examples 15 and 17 are not attributable to the catalytic effect of the DBU. Instead, the DBU is believed to be functioning as an activator for the bismuth catalyst.

What is claimed is:

1. A process for preparing a polyisocyanate-based polymer, comprising forming a reaction mixture containing at least one polyisocyanate, at least one isocyanate-reactive compound having at least two isocyanate-reactive groups and at least one catalyst, and then curing the reaction mixture in the absence of a blowing agent or frothing to form the polyisocyanate-based polymer, wherein the catalyst includes a bismuth salt of a mono- or dithiocarbonate compound, wherein the polyisocyanate-based polymer is a non-cellular cast elastomer, the polyisocyanate is a prepolymer or quasi-prepolymer having an isocyanate content of 8 to 18% by weight and the isocyanate-reactive compound is a chain extender or mixture of a chain extender and at least one polyol having a hydroxyl equivalent weight of at least 250.

2. The process of claim 1 wherein the bismuth salt of a mono- or dithiocarbonate compound has the structure:

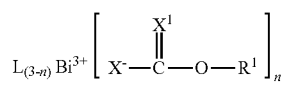

wherein X is sulfur or oxygen, $X^1$ is sulfur or oxygen, provided that at least one of X and $X^1$ is sulfur, each $R^1$ is independently a hydrocarbyl group that may be substituted with one or more heteroatom-containing substituent groups, n is a number from 1 to 3, and each L is independently an anion other than a mono- or dithiocarbonate anion.

3. The process of claim 2, wherein n is at least 2 and both X and $X^1$ are sulfur.

4. The process of claim 3, wherein n is 3.

5. The process of claim 1 wherein the bismuth salt of a mono- or dithiocarbonate compound is present in an amount from 0.01 to 3 millimoles per kilogram of polyisocyanate(s) and isocyanate-reactive material(s) present in the reaction mixture.

6. The process of claim 5 wherein the bismuth salt of a mono- or dithiocarbonate compound is present in an amount from 0.05 to 1 millimole per kilogram of polyisocyanate(s) and isocyanate-reactive materials) present in the reaction mixture.

7. The process of claim 6 wherein the reaction mixture contains at least one activator for the bismuth salt of a mono- or dithiocarbonate compound.

8. The process of claim 7 wherein the activator includes at least one aluminosilicate.

9. The process of claim 7 wherein the activator includes at least one inorganic or organic base.

10. The process of claim 9 wherein the activator is an amidine.

11. The process of claim 10 wherein the amidine is present, in an amount of not more than 1 millimole per kilogram of polyisocyanate(s) and isocyanate-reactive materials) present in the reaction mixture.

12. The process of claim 11 wherein the amidine is present in an amount from 0.1 to 5 moles per mole of the bismuth salt.

13. The process of claim 11 wherein the amidine is present in an amount from 0.5 to 3 moles of tertiary amine activator per mole of the bismuth salt of a mono- or dithiocarbonate compound.

* * * * *